United States Patent
Min et al.

(10) Patent No.: US 8,995,155 B2
(45) Date of Patent: Mar. 31, 2015

(54) PHOTOVOLTAIC POWER CONDITIONING SYSTEM AND METHOD EMPLOYING PARALLEL AND SERIES CONNECTION STRUCTURES

(75) Inventors: Byung Duk Min, Changwon (KR); Dong Wook Yoo, Changwon (KR); Ju Won Bak, Changwon (KR); Tae Jin Kim, Busan (KR); Jong Hyun Kim, Changwon (KR); Myung Hyo Ryu, Changwon (KR); Jong Pil Lee, Gimhae (KR)

(73) Assignee: Korea Electrotechnology Research Institute, Changwon (KR)

( * ) Notice: Subject to any disclaimer, the term of this patent is extended or adjusted under 35 U.S.C. 154(b) by 974 days.

(21) Appl. No.: 12/601,493

(22) PCT Filed: Dec. 28, 2006
(Under 37 CFR 1.47)

(86) PCT No.: PCT/KR2006/005840
§ 371 (c)(1),
(2), (4) Date: Feb. 5, 2010

(87) PCT Pub. No.: WO2007/105858
PCT Pub. Date: Sep. 20, 2007

(65) Prior Publication Data
US 2010/0142227 A1 Jun. 10, 2010

(30) Foreign Application Priority Data

Mar. 15, 2006 (KR) ........................ 10-2006-0023824

(51) Int. Cl.
*H02J 3/38* (2006.01)
(52) U.S. Cl.
CPC ................ *H02J 3/38* (2013.01); *Y10S 323/906* (2013.01)
USPC ............................... 363/65; 363/13; 323/906

(58) Field of Classification Search
CPC ................ H02J 1/00; G05F 1/00; G05F 1/12; G05F 1/24; G05F 1/46; H02M 3/00; H02M 3/335; H02M 5/45; H02M 5/458; H02M 7/48; H02M 7/537; H02M 7/538; H02M 7/5387; H02M 7/00
USPC ........ 363/13, 97, 98, 131, 132, 15, 16, 39, 40
See application file for complete search history.

(56) References Cited

U.S. PATENT DOCUMENTS 5,623,398 A * 4/1997 Beach et al. ..................... 363/65
6,151,234 A * 11/2000 Oldenkamp ................... 363/132

(Continued)

FOREIGN PATENT DOCUMENTS

| JP | 06-266457 A | 9/1994 |
| JP | 10-031525 A | 2/1998 |
| KR | WO2006/048689 * | 5/2006 ..................... 363/13 |

OTHER PUBLICATIONS

International Search Report and Written Opinion for PCT/KR2006/005840.

*Primary Examiner* — Jessica Han
*Assistant Examiner* — Gustavo Rosario Benitez
(74) *Attorney, Agent, or Firm* — LRK Patent Law Firm (57) ABSTRACT

A photovoltaic power conditioning system and method is provided. The system includes an isolated DC/DC converter (41), a DC/AC inverter (42), and a sine filter (43). The isolated DC/DC converter (41) receives a DC voltage from a solar cell through a parallel connection structure and converts the DC voltage into another DC voltage and then outputs the converted DC voltage through a series connection structure. The DC/AC inverter (42) converts the DC voltage output from the isolated DC/DC converter into an AC voltage. The sine filter (43) performs sine filtering on the AC voltage output from the DC/AC inverter and outputs the filtered AC voltage. The system employs a topology allowing it to be responsible for part of the output capacity, thereby significantly reducing the required capacity and increasing the system efficiency, so that the system can be applied to small and large-capacity photovoltaic power generation.

16 Claims, 5 Drawing Sheets

(56) References Cited

U.S. PATENT DOCUMENTS

| | | | |
|---|---|---|---|
| 2001/0048606 A1* | 12/2001 | Mallory | 363/65 |
| 2002/0034082 A1* | 3/2002 | Yokomizo et al. | 363/16 |
| 2006/0055366 A1* | 3/2006 | Tsunetsugu et al. | 320/101 |
| 2008/0037305 A1* | 2/2008 | West | 363/132 |
| 2008/0266922 A1* | 10/2008 | Mumtaz et al. | 363/131 |

* cited by examiner

PHOTOVOLTAIC POWER CONDITIONING SYSTEM AND METHOD EMPLOYING PARALLEL AND SERIES CONNECTION STRUCTURES

TECHNICAL FIELD

The present invention relates to a photovoltaic Power Conditioning System (PCS), and more particularly to a photovoltaic power conditioning system and method which employs a topology allowing the system to be responsible for part of the output capacity, thereby significantly reducing the required capacity and increasing the system efficiency, so that the system is suitable for application to small and large-capacity photovoltaic power generation.

BACKGROUND ART

Photovoltaic power generation (also referred to as "photovoltaics") is a technology for generating electricity from solar energy. This technology directly converts solar energy into electric energy using a photoelectric converter that is referred to as a "solar cell". Since the photovoltaic power generation can use limited amounts of light, it can also be used in cloudy weather and its utilization is higher than that of thermal power generation.

A variety of methods have been employed to achieve a reduction in the capacity of a photovoltaic power conditioning system and also to increase the efficiency of the system. One method is to reduce the number of components in the power circuit.

Figure 1:
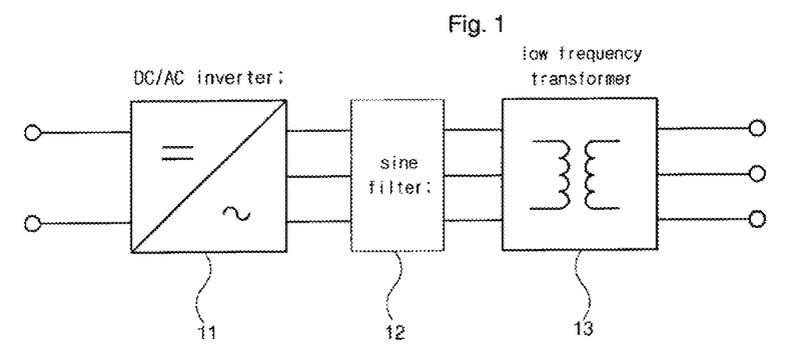
FIG. 1 is a block diagram of a conventional photovoltaic power conditioning system.
Figure 2:
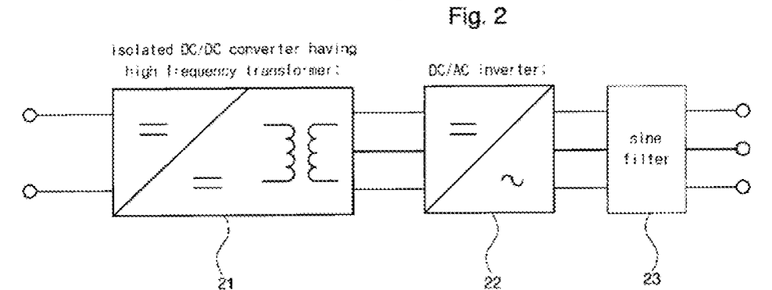
FIG. 2 is a block diagram of a conventional isolation type photovoltaic power conditioning system.
Figure 3:
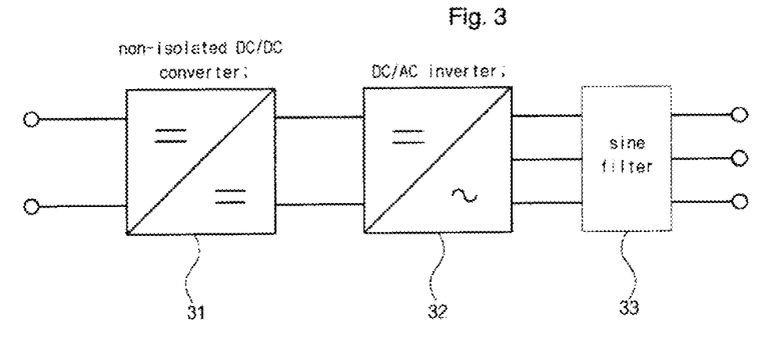
FIG. 3 is a block diagram of a conventional non-isolation type photovoltaic power conditioning system.

FIG. 1 illustrates an exemplary topology of PCSs for photovoltaic power generation. The conventional topology is mainly classified into an isolated PCS topology as shown in FIG. 2 and a non-isolated PCS topology as shown in FIG. 3. This classification is based on whether or not the solar array and the PCS output are isolated from each other with a transformer therebetween.

FIG. 1 is a block diagram of a conventional photovoltaic power conditioning system (PCS) employing an exemplary topology.

This system basically includes a DC/AC inverter 11, a sine filter 12, and a low frequency transformer 13. The DC/AC inverter 11 receives a DC voltage from a solar cell and converts it into an AC voltage. The sine filter 12 performs sine filtering on the AC voltage output from the DC/AC inverter 11. The low frequency transformer 13 converts the sine-filtered AC voltage into a low frequency and then outputs it to a general load.

Due to the characteristics of the solar cell, the output voltage of the solar cell varies between the maximum level and half thereof depending on the temperature and the level of irradiation. The photovoltaic power generation system is divided into a stand-alone type and a grid-connected type. The stand-alone type operates independent of the electric utility grid to supply AC voltage to a general load and the grid-connected type operates in conjunction with the grid to supply AC voltage to a general load. For example, a single-phase 220V grid-connected PCS is designed with a range of solar cell output levels of 150-400V. To supply 220V AC power with the wide range of input levels, the output voltage of the DC/AC inverter 11 is set to a voltage which it can generate with the minimum input voltage and the low frequency transformer 13 of the grid frequency is used to increase the output voltage in order to match it to the target AC output voltage "220V".

One advantage of the topology of FIG. 1 is simplicity. However, the system of FIG. 1 is big and heavy since it uses the low frequency transformer 13. In addition, since the output AC voltage of the DC/AC inverter 11 is generated based on the minimum DC input voltage, its current is increased for the same output power due to the low voltage. This increases the current capacity of components used for the DC/AC inverter 11. This also increases current flowing through the primary side of the low frequency transformer 13. This leads to an increase in the costs of the components and a reduction in the efficiency of the system.

FIG. 2 is a block diagram of a conventional isolation type photovoltaic power conditioning system. This topology overcomes the problems of the topology of FIG. 1 using an isolated DC/DC converter 21 having a high frequency transformer.

In the system of FIG. 2, the isolated DC/DC converter 21 having the high frequency transformer receives a DC voltage from a solar cell and converts it into another DC voltage and then performs high frequency transform of the converted DC voltage. A DC/AC inverter 22 converts the DC voltage output from the isolated DC/DC converter 21 into an AC voltage. A sine filter 23 performs sine filtering on the AC voltage output from the DC/AC inverter 22 and outputs the filtered AC voltage to a general load.

Since it uses the high frequency transformer, the system of FIG. 2 is advantageous over the system employing the low frequency transformer in terms of costs, size, and weight. In addition, the system of FIG. 2 can achieve a reduction in the current capacity of power components since it can keep the input voltage of the DC/AC inverter 22 at as high level as desired and can directly generate the output AC voltage.

However, the topology of FIG. 2 has the following problem. The efficiency of the system is expressed by the product of the efficiency of the converter at a front stage and the efficiency of the inverter at a subsequent stage. Without considering the efficiency of the common inverter, the efficiency of the converter must be at least equal to the low frequency transformer of FIG. 1 to allow the total efficiency to be equal to or higher than that of the system of FIG. 1. However, the efficiency of the converter is generally lower than the low frequency transformer, so that the efficiency of the system is lower than that of FIG. 1.

FIG. 3 is a block diagram of a conventional non-isolation type photovoltaic power conditioning system.

This system includes a non-isolated DC/DC converter 31, a DC/AC inverter 32, and a sine filter 33. The non-isolated DC/DC converter 31 receives a DC voltage from a solar cell and converts it into another DC voltage. The DC/AC inverter 32 converts the DC voltage output from the non-isolated DC/DC converter 31 into an AC voltage. The sine filter 33 performs sine filtering on the AC voltage output from the DC/AC inverter 32 and outputs the filtered AC voltage to a general load.

FIG. 3 shows a PCS topology using a non-isolated converter. Since circuitry of the non-isolated converter is simpler than that of the isolated converter, the non-isolation type PCS is advantageous over the isolation type PCS in term of price and thus the non-isolation type PCS has recently attracted a lot of attention.

However, the topology of FIG. 3 has the same problem as that of FIG. 2. Moreover, all the conventional topologies are similar in that the capacity of the converter required by the system is the same as the total capacity of the system. For this reason, the converter cannot be applied to a large capacity system despite a lot of advantages and as such can be applied only to a small capacity system.

In the exemplary topology of FIG. 1, the capacity of the converter must be equal to that of the system since it does not fully utilize the output characteristics of the solar cell, thereby reducing the efficiency of the system.

DISCLOSURE OF INVENTION

Technical Problem

The present invention proposes a new PCS topology to overcome the problems of the conventional topologies. The proposed PCS topology significantly reduces the capacity of the converter using the power generation characteristics of the solar cell, thereby increasing the efficiency of the system. Accordingly, the proposed topology is useful in providing a large-capacity PCS.

Thus, the present invention has been made in view of the above problems, and it is an object of the present invention to provide a photovoltaic power conditioning system and method which employs a topology allowing the system to be responsible for part of the output capacity, thereby significantly reducing the required capacity and increasing the system efficiency, so that the system can be applied to small and large-capacity photovoltaic power generation.

Technical Solution

In accordance with an aspect of the present invention, the above and other objects can be accomplished by the provision of a photovoltaic power conditioning system comprising an isolated DC/DC converter that receives a DC voltage from a solar cell through a parallel connection structure and converts the DC voltage into another DC voltage and then outputs the converted DC voltage through a series connection structure; a DC/AC inverter that converts the DC voltage output from the isolated DC/DC converter into an AC voltage; and a sine filter that performs sine filtering on the AC voltage output from the DC/AC inverter and outputs the filtered AC voltage.

In accordance with another aspect of the present invention, there is provided a photovoltaic power conditioning method comprising receiving, by an isolated DC/DC converter, a DC voltage from a solar cell through a parallel connection structure and converting the DC voltage into another DC voltage and then outputting the converted DC voltage through a series connection structure; converting the output DC voltage into an AC voltage; and performing sine filtering on the AC voltage and outputting the filtered AC voltage to a load.

Advantageous Effects

The photovoltaic power conditioning system and method according to the present invention significantly reduces a required power capacity of the system using a new DC/DC conversion structure in which a DC input portion is connected in parallel to a conversion input portion and a conversion output portion is connected in series to the DC input portion.

The system is designed by fully utilizing the power generation characteristics of the solar cell and using the new DC/DC conversion structure, so that the capacity of the converter can be greatly reduced to be below 20% of the rated capacity of the system.

The same output voltage as the grid voltage can be supplied by increasing the DC voltage, so that the rated current of the inverter can be reduced by half, thereby reducing the price of the components of the inverter and increasing the efficiency of the inverter.

The efficiency of the system can be significantly increased using the new DC/DC conversion structure and the power generation characteristics of the solar cell.

Since the capacity of the DC/DC converter is significantly reduced, the DC/DC converter can be applied not only to a small capacity system but also to a large capacity system.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Embodiments of a photovoltaic power conditioning system and method according to the present invention will now be described in detail with reference to the accompanying drawings.

The photovoltaic power conditioning system according to the present invention employs a topology allowing the system to be responsible for part of the output capacity, thereby significantly reducing the required capacity and increasing the system efficiency, so that the system can be applied to small and large-capacity photovoltaic power generation.

Figure 4:
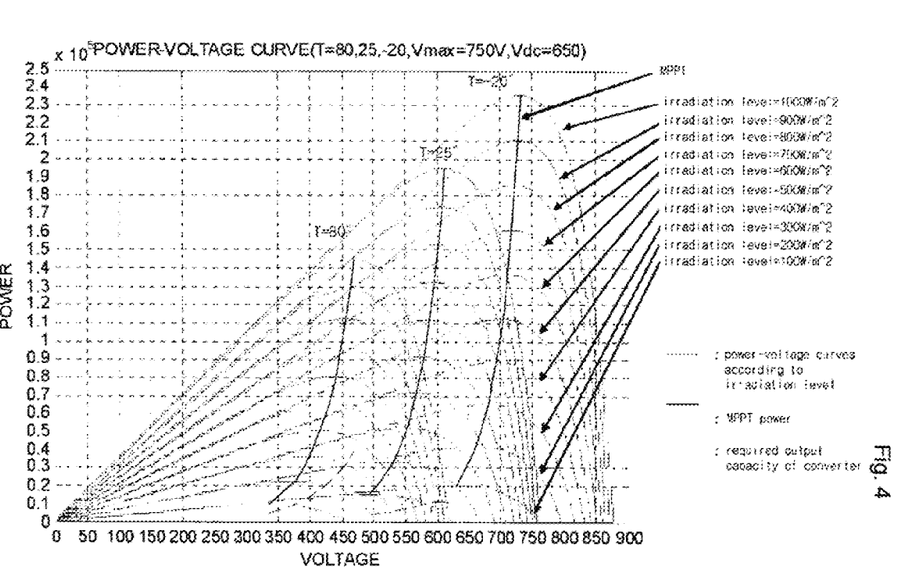
FIG. 4 is a graph showing characteristic curves of a general solar cell according to temperature and irradiation level.

FIG. 4 is a graph showing characteristic curves of a general solar cell according to temperature and irradiation level.

The solar cell can be modeled by Equations 1 to 3.

$$I = I_{LG} - I_{os}\left\{\exp\left[\frac{q}{AkT_K}(V + IR_s)\right] - 1\right\} - \frac{V + IR_s}{R_{sh}} \quad <\text{Math Figure 1}>$$

$$I_{os} = I_{or}\left(\frac{T_K}{T_r}\right)^3 \exp\left[\frac{qE_{GO}}{Bk}\left(\frac{1}{T_r} - \frac{1}{T_K}\right)\right] \quad <\text{Math Figure 2}>$$

$$I_{LG} = |I_{SC} - K_I(T - 25)|\frac{\lambda}{1000} \quad <\text{Math Figure 3}>$$

The following are the definitions of symbols in Equations 1 to 3.

$I_{os}$: cell reverse saturation current
T: cell temperature in ° C.
T: cell temperature in ° K.(=T+273.12)
k: Boltzmann's constant
q: electrical charge
$K_i$: short circuit current temperature coefficient at Isc (A/° C.)
λ: solar irradiation in W/m²
$I_{SC}$: short circuit current at 25° C. and 1000 W/m²
$I_{LG}$: light generated current
$E_{GO}$: band gap for silicon
B=A: ideality factor (1.92)
$T_r$: reference temperature (273.12+$T_{rc}$, ° K.)
$T_k$: operating cell temperature (273.12+T, ° K.)
$I_{or}$: cell saturation current at $T_r$
$R_{sh}$: shunt resistance
$R_s$: series resistance
V: solar cell output voltage
I: solar cell output current In the graph, thin lines are power-voltage curves according to irradiation level, bold lines represent Maximum Power Point Tracking (MPPT) power, and dotted lines represent required converter output capacities.

The input characteristics of the solar cell are the level of solar irradiation, the operating temperature of the solar cell, and the output voltage of the solar cell. The output characteristics of the solar cell vary depending on the level of solar radiation, to which the solar cell is exposed, and the operating temperature of the solar cell.

The graph of FIG. 4 shows the output characteristics of the solar cell according to the temperature and the irradiation level, which are obtained using the solar cell modeling equations. The output characteristics of the solar cell are obtained at three temperatures of 80° C., 25° C., and −20° C. and at 10 irradiation levels of 100 W/m² to 1000 W/m² when it is designed to have the maximum module power of 200 kW and the maximum voltage of 750V at an operating temperature of 25° C.

The solar cell is characterized in that, as the level of irradiation increases at the same temperature, the output of the solar cell increases and the voltage between the terminals of the solar cell increases. As the operating temperature of the solar cell increases, the output of the solar cell decreases and the voltage applied across the terminals of the solar cell decreases. Even in the same condition, the output of the solar cell greatly varies depending on the terminal voltage thereof as shown in FIG. 4. To achieve the maximum output in the same condition, the terminal voltage must be controlled to be kept at a maximum power point at which the output is maximized. This control is referred to as Maximum Power Point Tracking (MPPT).

Once the output voltage of a photovoltaic inverter is determined, a DC voltage required by the inverter is determined. Generally, a filter is attached to the inverter to remove a switching frequency from the output of the inverter and thus to meet a Total Harmonic Distortion (MD) condition of the current. This causes a reduction in the output voltage. In addition, a dead time is set to achieve a stable operation of the inverter. This also reduces the voltage by a certain level. These voltage reductions and a certain margin are considered when determining the DC voltage required by the inverter.

The DC voltage determined in this manner is the minimum voltage required for the inverter to output the predetermined AC voltage. When a DC voltage higher than the determined DC voltage is applied, the inverter can output the constant AC voltage through suitable Pulse Width Modulation (PWM) control. As can be seen from the characteristics curves of FIG. 4, the solar cell cannot always meet the constant DC voltage requirement demanded by the inverter and the solar cell output voltage always differs from the DC voltage required by the inverter. In another sense, to obtain the constant DC voltage to be input to the inverter, it is necessary only to generate a differential voltage between the constant DC input voltage of the inverter and the output voltage of the solar cell and then to add the differential voltage to the solar cell output voltage.

Figure 5:
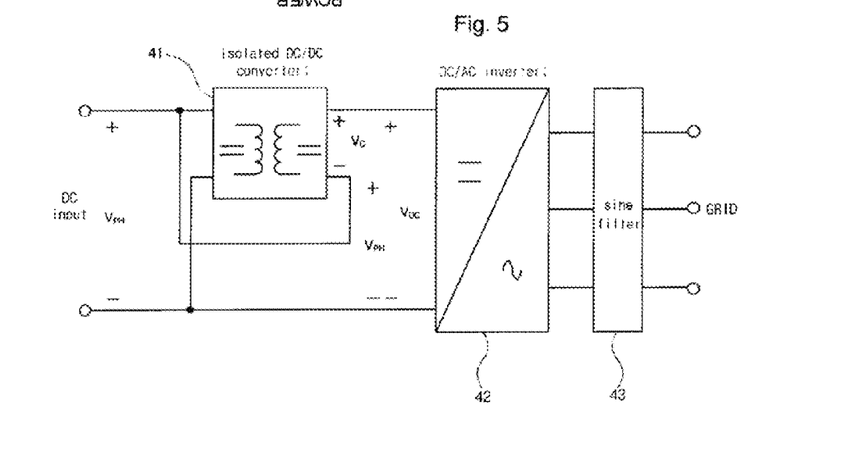
FIG. 5 is a block diagram of a photovoltaic power conditioning system according to an embodiment of the present invention.

To accomplish this, the present invention proposes a new photovoltaic power condition system (PCS) topology as shown in FIG. 5. In the proposed topology, a solar cell is connected in parallel to a converter at an input portion thereof and the solar cell is connected in series to the converter at an output portion thereof. The converter serves only to generate the differential voltage so that the required capacity of the converter is greatly reduced since the converter is not responsible for the total DC voltage. Here, it is preferable to use a small isolated DC/DC converter. This can be constructed using any type of converter that includes input and output portions isolated from each other with a transformer therebetween.

FIG. 5 is a block diagram of a photovoltaic power conditioning system according to an embodiment of the present invention.

As shown in FIG. 5, the photovoltaic power conditioning system includes an isolated DC/DC converter 41, a DC/AC inverter 42, and a sine filter 43. The isolated DC/DC converter 41 receives a DC voltage from a solar cell through a parallel connection structure and converts it into another DC voltage and then outputs it through a series connection structure. The DC/AC inverter 42 converts the DC voltage output from the isolated DC/DC converter 41 into an AC voltage. The sine filter 43 performs sine filtering on the AC voltage output from the DC/AC inverter 42 and outputs the filtered AC voltage.

In the parallel connection structure, a positive input (+) of the DC input portion is connected to a positive input terminal of the isolated DC/DC converter 41 and a negative input (−) of the DC input portion is connected to a negative input terminal of the isolated DC/DC converter 41.

In the series connection structure, a positive terminal output (+) of the isolated DC/DC converter 41, produced by conversion of a combination of the positive input (+) of the DC input portion and a negative terminal output (−) of the isolated DC/DC converter 41, is connected to a positive input terminal (+) of the DC/AC inverter 42 and the negative input (−) of the DC input portion is connected to a negative input terminal (−) of the DC/AC inverter 42.

The isolated DC/DC converter 41 receives the positive and negative inputs of the DC input portion and receives and outputs a combination of the negative terminal output of the isolated DC/DC converter 41 and the positive input of the DC input portion through the positive output terminal of the isolated DC/DC converter 41.

The isolated DC/DC converter 41 is constructed using a converter having an input/output isolation structure. Examples of the converter having the input/output isolation structure include a half bridge converter, a full bridge converter, and a push-pull converter.

The DC/AC inverter 42 receives the positive terminal output of the isolated DC/DC converter 41 through its positive terminal and receives the negative terminal output of the isolated DC/DC converter 41 through its negative terminal.

Since the output terminals of the isolated DC/DC converter 41 are connected in series, the same output current $I_{DC}$ flows through the output terminals thereof and, therefore, the DC output power $P_{DC}$ be expressed by Equation 4.

$$P_{DC} = V_{DC} \cdot I_{DC} \qquad \text{<Math Figure 4>}$$
$$= V_C \cdot I_{DC} + V_{PH} \cdot I_{DC} -$$
$$V_{PH} \cdot I_{DC} \cdot \left(1 + \frac{V_C}{V_{PH}}\right)$$

The ratio of power, for which the converter 41 is responsible, to the total DC output power, which will be referred to as "power share ratio", is the same as the ratio of the DC output voltage of the converter 41 to the total DC output voltage. This indicates that the power required of the converter 41 increases as the difference between the solar cell voltage and the input voltage of the inverter 42 increases and the power share ratio of the converter 41 rapidly decreases as the solar cell voltage approaches the output DC voltage.

The operation of the photovoltaic inverter differs from that of the general inverter. While the general inverter must always supply power required by loads, the photovoltaic inverter supplies power within the level of input power generated by the solar cell.

The required capacity of the converter 41 can be calculated from a possible power level and a DC voltage according to the temperature and irradiation level with reference to the solar cell characteristic curves in FIG. 4. From dotted curves of FIG. 4, which indicate calculated values of the required capacity of the converter 41, it can be seen that the largest capacity is required of the converter 41 when the solar cell is illuminated with the highest irradiation level at the highest operating temperature. At a temperature less than the highest operating temperature, the voltage of the solar cell increases so that the voltage increase required from the converter 41 decreases, thereby achieving a reduction in the capacity of the converter 41. If the converter 41 is designed with the proposed structure, the required capacity of the converter 41 is about only 20% of the rated output capacity as shown in FIG. 4, thus achieving a significant reduction in the capacity of the converter 41. The following are the specifications of a system designed with the solar cell characteristics of FIG. 4.

Highest solar cell voltage: 750V
Highest solar cell operating temperature: 80° C.
Inverter DC voltage: 650V
Inverter output voltage: 380$V_{AC}$
Inverter output: 200 kW
Required output: 40 kW
Inverter-to-converter output ratio: 1:0.2

As the highest operating temperature decreases, the DC voltage decrease is reduced, and therefore the required capacity of the converter 41 is also reduced.

Figure 6:
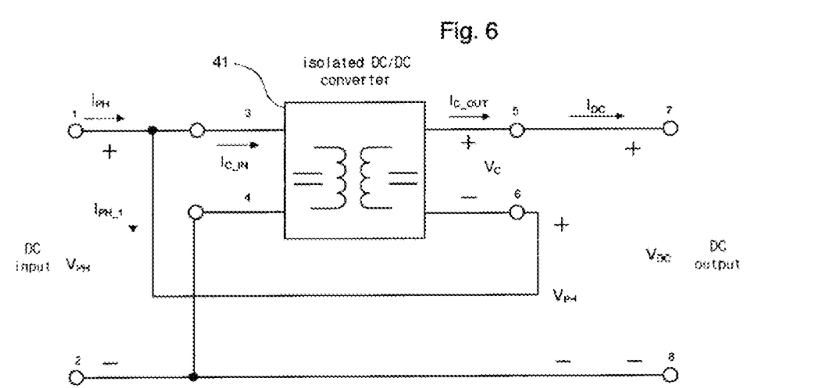
FIG. 6 is a detailed diagram of input and output portions of the isolated DC/DC converter in FIG. 5.
Figure 7:
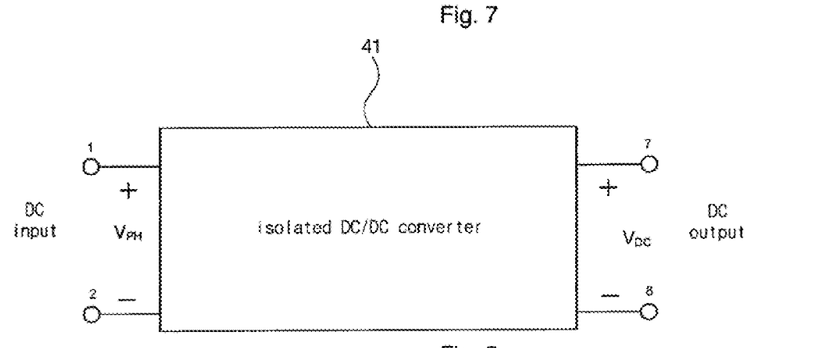
FIG. 7 is a simplified diagram of the input and output portions of the isolated DC/DC converter in FIG. 6.
Figure 8:
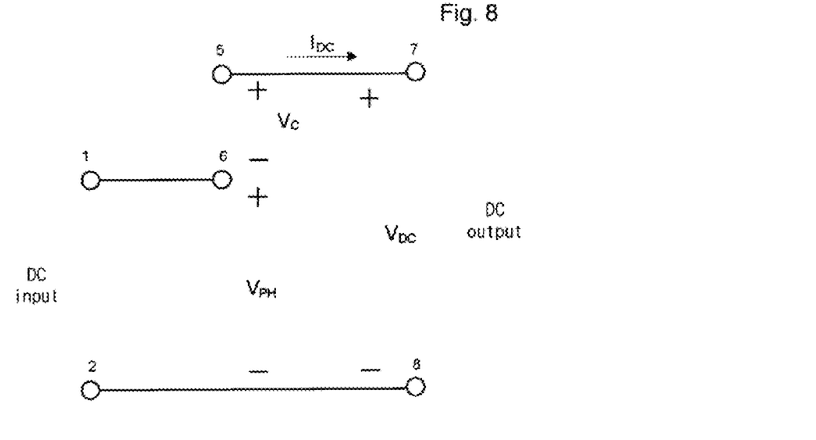
FIG. 8 is a conceptual diagram of a connection structure of the output portion of the DC/DC converter in FIG. 6.

FIG. 6 is a detailed diagram of input and output portions of the isolated DC/DC converter in FIG. 5, FIG. 7 is a simplified diagram of the input and output portions of the isolated DC/DC converter in FIG. 6, and FIG. 8 is a conceptual diagram of a connection structure of the output portion of the DC/DC converter in FIG. 6.

FIG. 6 illustrates the DC/DC conversion structure of the isolated DC/DC converter. This is the most important feature of the present invention, which can be applied to any application field that requires that the output voltage be higher than the input voltage.

In FIG. 6, input and output terminals are shown by circles with numbers.

In FIG. 6, numbers "1" and "2" denote positive and negative terminals of the DC input portion, which can also be referred to as an "input portion" for short. Numbers "3" and "4" denote two input terminals of the isolated DC/DC converter 41 and numbers "5" and "6" denote two output terminals of the isolated DC/DC converter 41. Numbers "7" and "8" denote positive and negative terminals of the output portion of this system.

FIG. 7 illustrates only the DC input and output portions of the isolated DC/DC converter 41. As shown in FIG. 6, the inner connection structure of the isolated DC/DC converter 41 is such that the terminal "1" of the DC input portion is connected to the input terminal "3" of the isolated DC/DC converter 41 and the terminal "2" of the DC input portion is connected to the input terminal "4" of the isolated DC/DC converter 41. The terminals "1" and "2" of the DC input portion are directly connected to the input terminals "3" and "4" of the DC/DC converter 41. In this context, the input connection structure is referred to as a "parallel connection structure". In this manner, a number of DC input portions can be connected in parallel to the input terminals of the isolated DC/DC converter 41.

The entire output portion of this system includes the terminals "7" and "8". The output terminal "5" of the isolated DC/DC converter 41 is directly connected to the positive terminal "7" of the DC output portion. However, the output terminal "6" of the isolated DC/DC converter 41 is connected to the input terminals "1" and "3". The input terminal "2" is directly connected to the output terminal "8". From the viewpoint of the input terminals "7" and "8" of the DC/AC inverter 42, the output terminals "5" and "6" of the isolated DC/DC converter 41 are connected in series to the input terminals "1" and "2". Specifically, the output portion has a connection structure such that a combination of the positive input "1" of the DC input portion and the negative output "6" of the isolated DC/DC converter 41 is input to the isolated DC/DC converter 41 through the positive input terminal "3" thereof and is then output to the positive terminal "7" of the DC output portion through the positive output terminal "5" of the isolated DC/DC converter 41. Therefore, the output connection structure is referred to as a "series connection structure".

It can be seen from the output connection structure of FIG. 8 that the output voltage $V_{DC}$ is the sum of the input voltage $V_{PH}$ and the output voltage $V_C$ of the isolated DC/DC converter 41.

Due to this connection structure, the isolated DC/DC converter 41 is responsible for part of the output voltage rather than the whole thereof, thereby achieving a reduction in the capacity of the isolated DC/DC converter 41.

More specifically, the same output current $I_{DC}$ flows through the output terminals of the isolated DC/DC converter 41 since the output terminals thereof are connected in series. The input and output currents of the isolated DC/DC converter 41 are expressed by Equations 5 to 7.

$$I_{PH} = I_{CIN} + I_{PH\_1} \qquad \text{<Math Figure 5>}$$

$$I_{DC} = I_{PH\_1} = I_{C\_OUT} \qquad \text{<Math Figure 6>}$$

$$P_{OUT} = I_{COUT}V_C + I_{PH1}V_{Ph} \qquad \text{<Math Figure 7>}$$
$$= I_{DC}V_C + I_{DC}V_{PL}$$
$$= P_C + P_{Ph}$$

The following are the definitions of symbols in Equations 5 to 7.

$I_{PH}$: total input current
$I_{C\_IN}$: input current of isolated DC/DC converter
$I_{PH\_j}$: current directly flowing to output portion, obtained by subtracting DC/DC converter input current from total input current $IC_{\_OUT}$: output current of isolated DC/DC converter
$I_{DC}$: total output current
$V_{PH}$: total input voltage
$V_C$: output voltage of isolated DC/DC converter
$P_{OUT}$: total output power
$P_C$: output power of isolated DC/DC converter
$P_{PH}$: total input power The isolated DC/DC converter 41 may use any type of converter such as a half bridge converter, a full bridge converter, and a push-pull converter. The features of the proposed structure can be achieved no matter what internal circuit configuration is used to construct the isolated DC/DC converter 41, provided that the terminals of the isolated DC/DC converter 41 are connected as shown in FIG. 5.

The capacity of the converter is calculated in the following manner.

It can be seen from the simulation results of FIG. 4 that the highest capacity of the converter is required in a condition with the highest operating temperature and the highest irradiation level. The capacity of the converter can be calculated by determining a solar cell output voltage and power in this condition.

$$I_{DC_{TM}} = \frac{P_{PH_{TM}}}{V_{DC}} \qquad <\text{Math Figure 8}>$$

$$P_C = I_{DC_{TM}} \cdot (V_{DC} - V_{PH_{TM}}) \qquad <\text{Math Figure 9}>$$
$$= P_{PH_{TM}} \frac{V_{DC} - V_{PH_{TM}}}{V_{DC}}$$

Here, "$V_{PH_{TM}}$" denotes a solar cell output voltage at the highest operating temperature and "$P_{PH_{TM}}$" denotes a solar cell output power at the highest operating temperature.

The converter capacity calculated using the system design specifications and the solar cell characteristic curves of FIG. 4 can be expressed by Equations 10 to 12.

$$V_{PH_{TM}} = 470\,\text{V} \qquad <\text{Math Figure 10}>$$

$$P_{PH_{TM}} = 145\,\text{kW} \qquad <\text{Math Figure 11}>$$

$$P_C = 145\,\text{kW} \cdot \frac{650\,\text{V} - 470\,\text{V}}{650\,\text{V}} = 40.15\,\text{kW} \qquad <\text{Math Figure 12}>$$

Accordingly, with the converter having a capacity 80% less than that of the conventional topologies of FIGS. 1 to 3, the present invention can exhibit the same characteristics as those of the conventional topologies. Thus, the present invention can significantly reduce the burden of constructing the converter and make it easy to construct a large-capacity system using a converter. These results are obtained under the assumption that the solar cell operating temperature is 80° C. and a converter with a much lower capacity is required at an operating temperature lower than 80° C.

The following is a description of system efficiencies.

Figure 9:
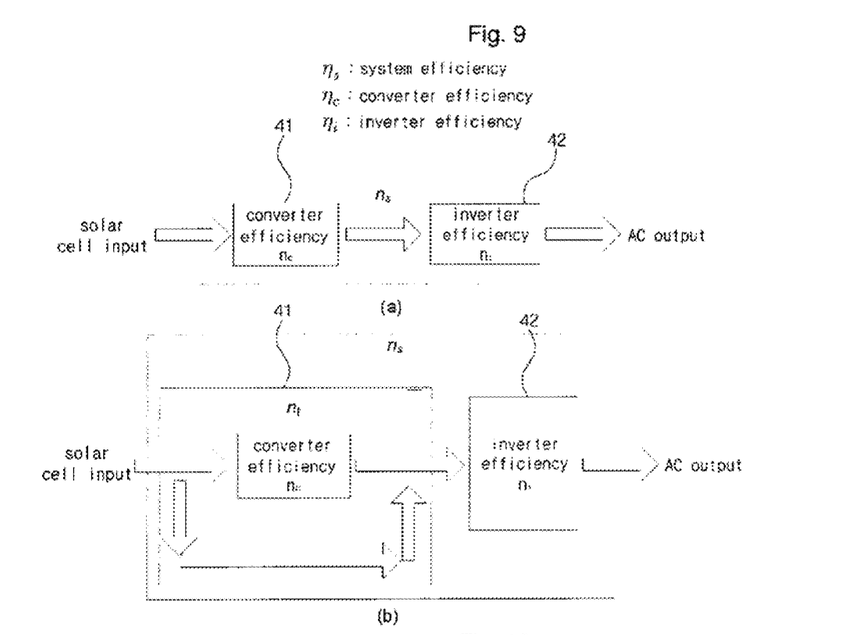
FIG. 9 is a block diagram of the system of FIG. 5 to illustrate the efficiency of each block of the system.

FIG. 9 is a block diagram of the system of FIG. 5 to illustrate the efficiency of each block of the system.

The total efficiency of a system which uses the converter of FIGS. 1 to 3 is expressed by Equation 13.

$$\eta_s = \eta_c \cdot \eta_i \qquad <\text{Math Figure 13}>$$

The following are the definitions of symbols in Equation 13.
$\eta_s$: system efficiency
$\eta_c$: converter efficiency
$\eta_i$: inverter efficiency The total system efficiency is expressed by the product of the converter efficiency and the inverter efficiency. Since the total system efficiency is obtained by multiplying the inverter efficiency by the converter efficiency, the total system efficiency significantly varies depending on the efficiency of the converter.

In the present invention, the converter is responsible for part of the total power and the remaining power is supplied without any power conditioning structure so that the remaining power is transferred at an efficiency of 100%. The converter efficiency of the present invention is expressed by Equations 14 and 15.

$$\eta_t = p + (1-p) \cdot \eta_c \qquad <\text{Math Figure 14}>$$

$$p = \frac{P_s - P_c}{P_s} \qquad <\text{Math Figure 15}>$$

The following are the definitions of symbols in Equations 14 and 15.
$\eta_t$: total efficiency at a stage prior to inverter
p: ratio of power directly supplied by solar cell
$P_s$: total system power
$P_c$: power supplied by converter The efficiency of the system can be expressed by Equation 16.

$$\eta_s = \eta_t \cdot \eta_i \qquad <\text{Math Figure 16}>$$

In application fields where the output voltage of the converter is unnecessary, the converter does not cause any efficiency loss and therefore it is necessary only to consider the efficiency of the inverter. This achieves a highly efficient system. Also in application fields where the converter is responsible for part of the output voltage, the converter supplies only a part of the output power, thereby significantly increasing the efficiency.

Figure 10:
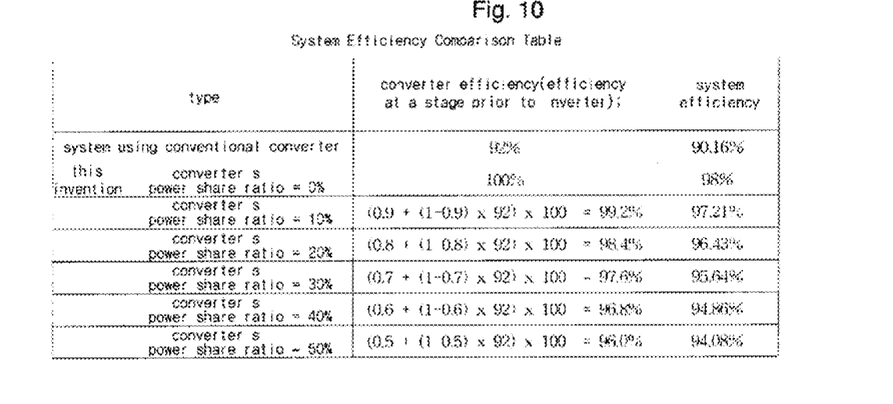
FIG. 10 is a table providing the comparison between the efficiencies of the system of the present invention and the conventional system.

FIG. 10 is a table providing the comparison between the efficiencies of the system of the present invention and the conventional system.

The fact that the system efficiency is significantly increased can be seen from the example of FIG. 10. The comparison table of FIG. 10 is obtained by determining the efficiencies of the system of the present invention and the conventional system under the assumption that the efficiency of the inverter is 98% and the efficiency of the converter is 92%. The power share ratio of the converter is up to 50%.

As can be seen from the efficiency comparison table of FIG. 10, when the solar cell outputs a DC voltage high enough to directly obtain 100% of the total power, it is necessary only to consider the efficiency of the inverter so that the efficiency of the system is significantly increased. Regardless of the power share ratio of the converter, the system according to the present invention can achieve a much higher efficiency than that of the system including the conventional converter.

Figure 11:
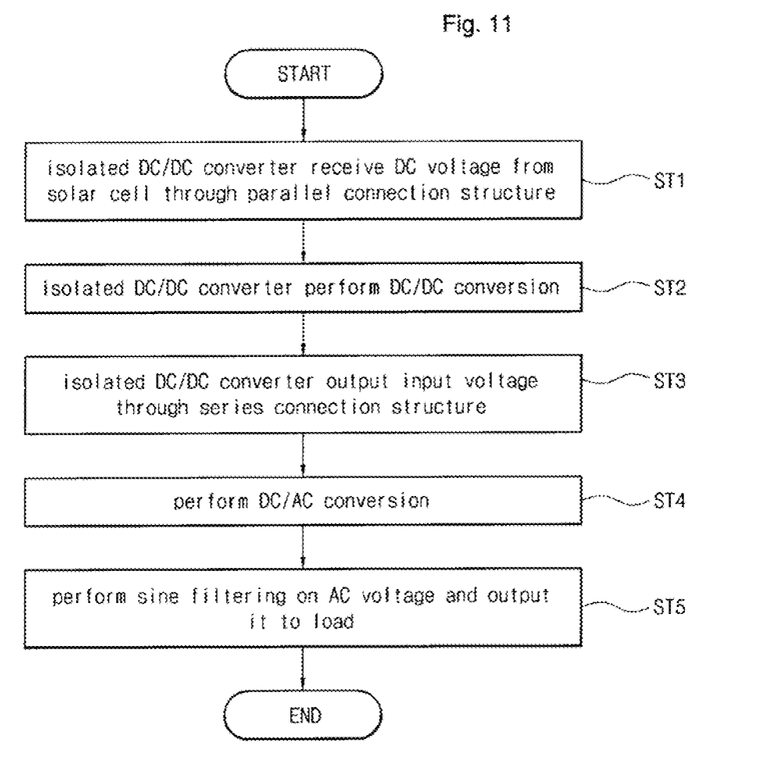
FIG. 11 is a flow chart of a photovoltaic power conditioning method according to an embodiment of the present invention.

FIG. 11 is a flow chart of a photovoltaic power conditioning method according to an embodiment of the present invention.

As shown in FIG. 11, the photovoltaic power conditioning method includes a first process (ST1-ST3) in which the isolated DC/DC converter 41 receives a DC voltage from a solar cell through a parallel connection structure and converts it into another DC voltage and then outputs it through a series connection structure, a second process (ST4) in which the output DC voltage is converted into an AC voltage, and a third process (ST5) in which sine filtering is performed on the AC voltage and the filtered AC voltage is output to loads.

INDUSTRIAL APPLICABILITY

As described above, the photovoltaic power conditioning system according to the present invention employs a topology allowing the system to be responsible for part of the output capacity, thereby significantly reducing the required capacity and increasing the system efficiency, so that the system can be applied to small and large-capacity photovoltaic power generation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A photovoltaic power conditioning system comprising:
an isolated DC/DC converter that receives a DC voltage from a solar cell through a parallel connection structure and converts the DC voltage into another DC voltage and then outputs the converted DC voltage through a series connection structure;
a DC/AC inverter that converts the DC voltage output from the isolated DC/DC converter into an AC voltage; and
a sine filter that performs sine filtering on the AC voltage output from the DC/AC inverter and outputs the filtered AC voltage,
wherein the isolated DC/DC converter receives positive and negative inputs of a DC input portion of the system and outputs a combination of a negative terminal output of the isolated DC/DC converter and the positive input of the DC input portion through a positive output terminal of the isolated DC/DC converter,
wherein the negative terminal output of the isolated DC/DC converter is directly connected to the positive input of the DC input portion, and thus the negative terminal output of the isolated DC/DC converter has the same voltage as the positive input of the DC input portion,
wherein an output of the positive output terminal of the isolated DC/DC converter is the sum of the DC voltage from the DC input and a voltage from the negative terminal output of the isolated DC/DC converter, and
wherein the isolated DC/DC converter has a single DC output.

2. The system according to claim 1, wherein, in the parallel connection structure, a positive input of a DC input portion of the system is connected to a positive input terminal of the isolated DC/DC converter and a negative input of the DC input portion is connected to a negative input terminal of the isolated DC/DC converter.

3. The system according to claim 1, wherein, in the series connection structure, a positive terminal output of the isolated DC/DC converter, produced by conversion of a combination of a positive input of a DC input portion of the system and a negative terminal output of the isolated DC/DC converter, is connected to a positive input terminal of the DC/AC inverter and a negative input of the DC input portion is connected to a negative input terminal of the DC/AC inverter.

4. The system according to claim 1, wherein the isolated DC/DC converter is constructed using a converter having an input/output isolation structure.

5. The system according to claim 4, wherein a capacity of the isolated DC/DC converter is calculated by determining voltage and power in a condition with the highest operating temperature and the highest irradiation level.

6. The system according to claim 5, wherein the capacity of the isolated DC/DC converter is calculated using the following equation:

$$I_{DC_{TM}} = \frac{P_{PH_{TM}}}{V_{DC}}$$

$$P_C = I_{DC_{TM}} \cdot (V_{DC} - V_{PH_{TM}})$$

$$= P_{PH_{TM}} \frac{V_{DC} - V_{PH_{TM}}}{V_{DC}}$$

where "$V_{PH_{TM}}$" denotes a solar cell output voltage at the highest operating temperature and "$P_{PH_{TM}}$" denotes a solar cell output power at the highest operating temperature.

7. The system according to claim 6, wherein the DC/AC inverter receives the positive terminal output of the isolated DC/DC converter through a positive input terminal of the DC/AC inverter and receives the negative terminal output of the isolated DC/DC converter through a negative terminal thereof.

8. A photovoltaic power conditioning method for a photovoltaic power conditioning system that comprises an isolated DC/DC converter that receives a DC voltage from a solar cell through a parallel connection structure and converts the DC voltage into another DC voltage and then outputs the converted DC voltage through a series connection structure; a DC/AC inverter that converts the DC voltage output from the isolated DC/DC converter into an AC voltage; and a sine filter that performs sine filtering on the AC voltage output from the DC/AC inverter and outputs the filtered AC voltage, the photovoltaic power conditioning method comprising:
receiving, by the isolated DC/DC converter, the DC voltage from a solar cell through a parallel connection structure and converting the DC voltage into another DC voltage and then outputting the converted DC voltage through a series connection structure;
converting the output DC voltage into the AC voltage; and
performing sine filtering on the AC voltage and outputting the filtered AC voltage to a load,
wherein the isolated DC/DC converter receives positive and negative inputs of a DC input portion of the system and outputs a combination of a negative terminal output of the isolated DC/DC converter and the positive input of the DC input portion through a positive output terminal of the isolated DC/DC converter,
wherein the negative terminal output of the isolated DC/DC converter is directly connected to the positive input of the DC input portion, and thus the negative terminal output of the isolated DC/DC converter has the same voltage as the positive input of the DC input portion,
wherein an output of the positive output terminal of the isolated DC/DC converter is the sum of the DC voltage from the DC input and a voltage from the negative terminal output of the isolated DC/DC converter, and
wherein the isolated DC/DC converter has a single DC output.

9. The system according to claim 2, wherein the isolated DC/DC converter is constructed using a converter having an input/output isolation structure.

10. The system according to claim 3, wherein the isolated DC/DC converter is constructed using a converter having an input/output isolation structure.

11. The system according to claim 9, wherein a capacity of the isolated DC/DC converter is calculated by determining voltage and power in a condition with the highest operating temperature and the highest irradiation level.

12. The system according to claim 10, wherein a capacity of the isolated DC/DC converter is calculated by determining voltage and power in a condition with the highest operating temperature and the highest irradiation level.

13. The system according to claim 11, wherein the capacity of the isolated DC/DC converter is calculated using the following equation:

$$I_{DC_{TM}} = \frac{P_{PH_{TM}}}{V_{DC}}$$

$$P_C = I_{DC_{TM}} \cdot (V_{DC} - V_{PH_{TM}})$$
$$= P_{PH_{TM}} \frac{V_{DC} - V_{PH_{TM}}}{V_{DC}}$$

where "$V_{PH_{TM}}$" denotes a solar cell output voltage at the highest operating temperature and "$P_{PH_{TM}}$" denotes a solar cell output power at the highest operating temperature.

14. The system according to claim 12, wherein the capacity of the isolated DC/DC converter is calculated using the following equation:

$$I_{DC_{TM}} = \frac{P_{PH_{TM}}}{V_{DC}}$$

$$P_C = I_{DC_{TM}} \cdot (V_{DC} - V_{PH_{TM}})$$
$$= P_{PH_{TM}} \frac{V_{DC} - V_{PH_{TM}}}{V_{DC}}$$

where "$V_{PH_{TM}}$" denotes a solar cell output voltage at the highest operating temperature and "$P_{PH_{TM}}$" denotes a solar cell output power at the highest operating temperature.

15. The system according to claim 13, wherein the DC/AC inverter receives the positive terminal output of the isolated DC/DC converter through a positive input terminal of the DC/AC inverter and receives the negative terminal output of the isolated DC/DC converter through a negative terminal thereof.

16. The system according to claim 14, wherein the DC/AC inverter receives the positive terminal output of the isolated DC/DC converter through a positive input terminal of the DC/AC inverter and receives the negative terminal output of the isolated DC/DC converter through a negative terminal thereof.

* * * * *